(12) United States Patent
King, Jr. et al.

(10) Patent No.: US 7,235,739 B2
(45) Date of Patent: Jun. 26, 2007

(54) BOX EXTENDER

(76) Inventors: Lloyd Herbert King, Jr., 394 Larimore Valley Dr., Chesterfiled, MO (US) 63005; Michael Belgeri, 1007 Bridgeport, Ellisville, MO (US) 63011; James C. Keeven, 2641 Whitetail La., O'Fallon, MO (US) 63366; William Hiner, 8 Briarcastle Ct., O'Fallon, MO (US) 63366

( * ) Notice: Subject to any disclaimer, the term of this patent is extended or adjusted under 35 U.S.C. 154(b) by 0 days.

(21) Appl. No.: 11/274,457

(22) Filed: Nov. 14, 2005

(65) Prior Publication Data
US 2007/0107924 A1    May 17, 2007

(51) Int. Cl.
*H01H 9/02* (2006.01)
(52) U.S. Cl. .......... 174/58; 174/480; 174/481; 174/53; 174/57; 220/3.2; 220/3.3; 248/906
(58) Field of Classification Search .......... 174/58, 174/53, 57, 17 R, 61, 62, 50, 48, 63, 480, 174/481; 220/3.2, 3.3, 3.4, 3.5, 3.6, 3.7, 220/3.8, 3.9, 4.02; 248/906, 343, 909; 439/535, 439/536, 537; D13/152
See application file for complete search history.

(56) References Cited

U.S. PATENT DOCUMENTS

| 1,117,084 | A | | 11/1914 | Phelps |
|---|---|---|---|---|
| 2,378,861 | A | * | 6/1945 | Peevey .......... 220/3.7 |
| 2,989,206 | A | * | 6/1961 | McAfee .......... 220/3.7 |
| 4,134,636 | A | * | 1/1979 | Kleinatland et al. ...... 174/58 |
| 4,197,959 | A | | 4/1980 | Kramer .......... 220/242 |
| 4,228,317 | A | | 10/1980 | Cziment .......... 174/67 |
| 4,733,330 | A | | 3/1988 | Tanaka et al. .......... 361/356 |
| 4,927,039 | A | * | 5/1990 | McNab .......... 174/57 |
| 5,012,043 | A | * | 4/1991 | Seymour .......... 174/57 |
| 5,042,673 | A | * | 8/1991 | McShane .......... 174/57 |
| 5,117,996 | A | * | 6/1992 | McShane .......... 174/57 |
| 5,402,902 | A | * | 4/1995 | Bouley .......... 220/3.2 |
| 5,408,046 | A | | 4/1995 | Vandeventer .......... 174/67 |
| 5,456,377 | A | | 10/1995 | Williams, Jr. .......... 220/3.8 |
| 5,594,205 | A | | 1/1997 | Cancellieri et al. .......... 174/53 |
| 5,682,017 | A | | 10/1997 | Marrotte .......... 174/53 |
| 5,712,450 | A | | 1/1998 | Chan et al. .......... 174/66 |
| 5,723,817 | A | | 3/1998 | Arenas et al. .......... 174/66 |
| 5,975,323 | A | * | 11/1999 | Turan .......... 220/3.7 |
| 6,051,788 | A | | 4/2000 | Nichols .......... 174/67 |
| 6,369,322 | B1 | * | 4/2002 | Gretz .......... 174/50 |
| 6,457,988 | B1 | | 10/2002 | Andersen .......... 439/373 |
| 6,653,566 | B2 | | 11/2003 | Petak et al. .......... 174/66 |
| 6,820,760 | B2 | | 11/2004 | Wegner et al. .......... 220/3.94 |
| 6,953,894 | B2 | * | 10/2005 | Ungerman et al. .......... 174/58 |
| 7,053,301 | B2 | * | 5/2006 | Johnson .......... 174/58 |
| 2003/0066832 | A1 | | 4/2003 | Kipka et al. .......... 220/4.02 |
| 2003/0189043 | A1 | | 10/2003 | Wegner et al. .......... 220/4.03 |

* cited by examiner

*Primary Examiner*—Angel R. Estrada
(74) *Attorney, Agent, or Firm*—Jacobson & Johnson

(57) ABSTRACT

A junction box extension method and apparatus for creating additional space proximate an existing junction box without having to remove the existing junction box. The junction box extension has an open box with a lip on one side and a rim on the other, a flange for holding the box proximate the existing junction box where the lip of the open box protrudes beyond the wall, and a cover to provide a finished appearance as the junction box extension engages the junction box to provide additional useable space.

16 Claims, 3 Drawing Sheets

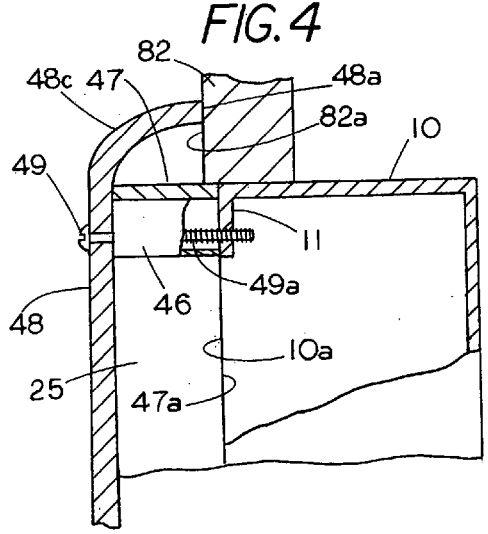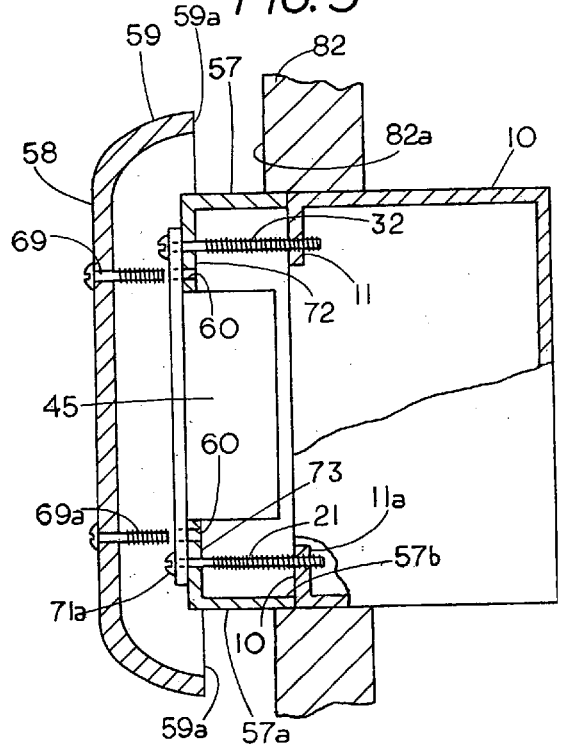

BOX EXTENDER

FIELD OF THE INVENTION

The invention is a junction box extension and more particularly a junction box extension that can be installed or retrofitted on a junction box to create additional space proximate the junction box to accommodate ground fault indicators, dimmers or the like. The junction box extension protrudes beyond the wall surface and includes a cover that extends back to the wall to provide a finished appearance.

CROSS-REFERENCE TO RELATED APPLICATIONS

None

STATEMENT REGARDING FEDERALLY SPONSORED RESEARCH OR DEVELOPMENT

None

REFERENCE TO MICROFICHE APPENDIX

None

BACKGROUND OF THE INVENTION

Electrical junction boxes are used in homes to hold receptacles and switches. If changes or additions are made to the wiring, the junction boxes often have inadequate space for modern safety or convenience electrical devices, such as ground fault indicators and dimmer switches.

To address a limited space problem in junction boxes, a junction box extension ring is used to expand the space within the junction box. However, the junction box extension rings are usually suitable for use during the original construction process and do not extend beyond the wall surface.

To create more space within existing junction boxes, the present invention includes a junction box extension that creates additional space by extending the junction box beyond the wall surface and includes a cover that extends back to the wall surface to provide a finished appearance that can also encapsulate electrical connections in the junction box.

BRIEF SUMMARY OF THE INVENTION

A junction box extension method and apparatus comprising an extender that can be placed proximate the existing junction box to increase the size of the junction box beyond the wall surface and a cover that can be secured over the extender to provide a finished wall appearance.

BRIEF DESCRIPTION OF THE DRAWINGS

FIG. 4 is a cross-sectional view of an alternate embodiment of a wall-mounted junction box extension and cover;

FIG. 5 is a perspective view of another embodiment of a wall-mounted junction box extension.

DESCRIPTION OF THE PREFERRED EMBODIMENTS

Figure 1:
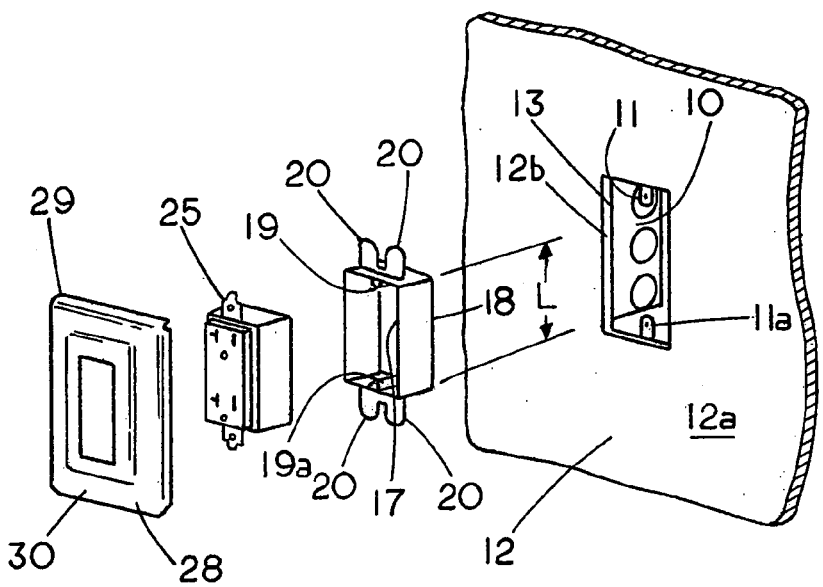
FIG. 1 is an exploded perspective view of a wall-mounted junction box extension and cover.

FIG. 1 shows an exploded view that includes a portion of a wall 12 with a prior art junction box 10 mounted therein with box extension 17 and cover 29 of the present invention positioned proximate an electrical device 25 that is to be mounted injunction box 10.

Typically, the junction box 10 is securely mounted to the framework of the building with access to the interior of the junction box 10 available through an opening 12b in wall 12. In the embodiment shown, the peripheral edge 13 of junction box 10 is visible through opening 12b and is slightly recessed from wall surface 12a. The junction box 10 includes an upper ear 11 and a lower ear 11a with each ear having a hole with a threaded sidewall for receiving a threaded fastener, such as a bolt with a slotted head, to enable one to secure the electrical device 25 and the junction box extension or extender 17 to the junction box with a screwdriver.

Typically, the wall-mounted junction box 10 is designed to encompass an electrical device such as an outlet receptacle or an electrical switch as well as the wire junctions thereto. However, when the existing electrical device needs to be replaced by a larger electrical device, for example replacing a conventional on off switch with a larger dimmer switch or when a new larger outlet receptacle replaces an existing outlet receptacle the existing junction box may not have enough space to safely accommodate both the new electrical device as well as the necessary wire junctions. Also, in some cases one might only want to add additional wires to the junction box but are prohibited from doing so because the junction box lacks available space as required by the electrical code.

In order to create additional space in an electrical junction box one might try to squeeze or compress the existing wire connections therein into a smaller space. If compression of the wire junctions is not possible the junction box will have to be removed and replaced with a larger junction box. Since the junction box is fixedly mounted to the building framework and is on the inside of the wall it usually requires removing a portion of the wall before one is able to remove and replace the junction box. Once the larger junction box is inserted one has to repair the wall. As a result, it becomes time consuming and costly to replace an existing electrical device with a new larger electrical device or to introduce additional wire connections into the junction box that lacks available space. As a result it can discourage a homeowner from upgrading his or her home because of the lack of space available in the junction boxes.

FIG. 1 shows an exploded perspective view with one embodiment of a nestable box extension 17 positioned proximate wall 12 with box extension 17 including an open box 17c having a shape similar to the shape of the open end of the junction box in the wall. The open box 17 includes an upper set of outwardly extending wall flanges 20 and a set of lower outwardly extending wall flanges 20 for abutting against a wall surface to hold the box extension 17 in a nestable condition. A first sleeve 19 is located on the inside face of one end of box extension 17 and a second sleeve 19a is located on the inside face of the other end of box extension 17. The electrical device 25 is positioned between a cover 28 and box extension 17.

Figure 1A:
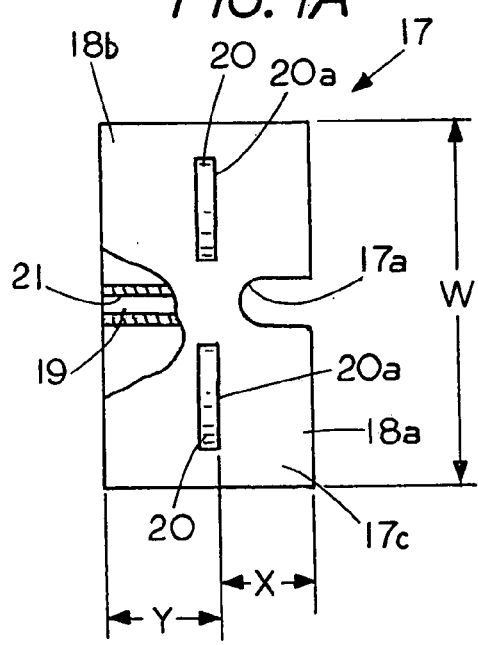
FIG. 1A is a partial top view of a wall-mounted box extension.

FIG. 1A shows a partial top view of nestable box extension 17 having a width designated by W and FIG. 1 shows the length of the box extension designated by L. The portion of the junction box extension to the right of the flanges 20a is designated as a rim 18a and the portion of the junction box extension 17 to the left of the flanges 20a is designated as lip 18b of the junction box extension 17. In this embodiment the exterior dimensions W and L of box extension 17 are less than the corresponding interior dimensions of the junction box 10 to allow rim 18 of box extension 17 to nest in junction box 10. That is, box extension 17 can be inserted into the existing junction box 10 until the backside 20a of flanges 20 engage a wall to limit the penetration of the box extension 17 into the junction box. The spacing of wall flanges 20 a distance x from the back edge 18 of the box extension 17 limits the penetration of the rim 18a into the junction box 10. On the other hand, the distance that the lip 18b of the junction box extension 17 that projects out from the wall 12 is denoted by y and is related to the additional volume that is added to the existing junction box with the present invention. In order to prevent the box extension from engaging the ears 11 and 11a in the junction box an upper recess or ear relief 17a in box extension 17 and an identical lower recess or ear relief 17b (see FIG. 2) in the lower portion of box extension 17 allows the box extension 17 to extend past the ears 11 and 11a and into the junction box 10.

The use of flanges as limitation on the amount of penetration into the junction box 10 provides a dual function. First, it allows one size box extension to be mated to junction boxes even though the distance of the junction box from the wall surface is not uniform from junction box to junction box. That is, if a junction box has a leading edge that is recessed a ¼-inch or ¾-inch, the box extension 17 of the present invention can be used with either junction box since the back edges of the box extension nest within the junction box. Second, the box extension 17 provides for a uniform distance y of the leading edge 18b from the wall 12. As a result a single cover can be used to mate the box extension 17 to the wall surface 12a since the distance y that the box extension projects outwardly the same distance. Thus cover 28 and box extension 17 provide a universal box extension greatly simplifying the task of increasing the volume of a junction box by providing a junction box extension 17 that engages a wall mounted junction box 10. While multiple outwardly extending flanges are shown a single peripheral flange can also be used to support the box extension on the wall surface.

Figure 1B:
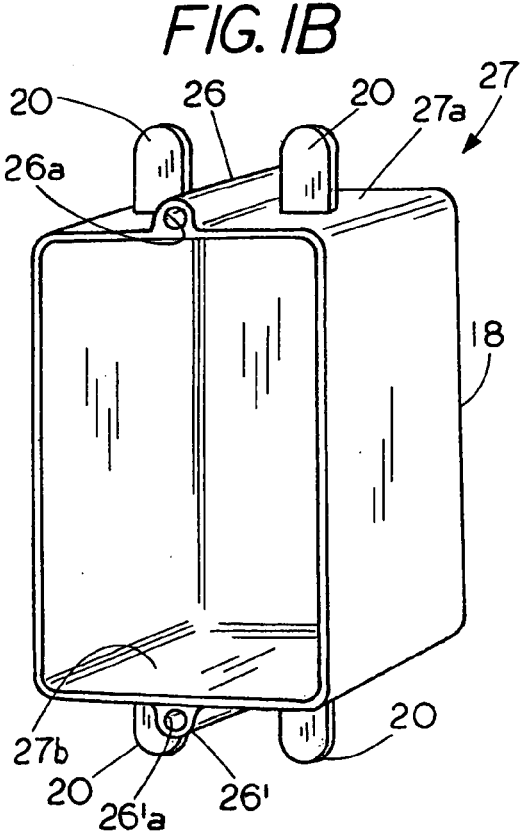
FIG. 1B is a perspective view of a wall-mounted junction box extension.

FIG. 1B shows the preferred embodiment of a junction box 27. In this embodiment the like parts found in junction box 17 have identical numbers. However, in the embodiments of FIG. 1B the upper sleeve 26 is affixed to the exterior top surface 27a of junction box 27 and the lower sleeve 26' is affixed to the exterior under surface of junction box 27. In the preferred embodiment a top screw is inserted into the top passage 26a in sleeve 26, which is integrally molded onto box extension 27, and into a top ear on the junction box in the wall and a bottom screw is inserted into the passage 26'a in sleeve 26' and into a lower ear on the junction box in the wall. In the embodiment of FIG. 1 or FIG. 1B the junction box extension is held proximate the junction box in the wall through the use of conventional screws, which can also hold an electrical device in the wall junction box 10 and the junction box extension 17 or 27.

Figure 3:
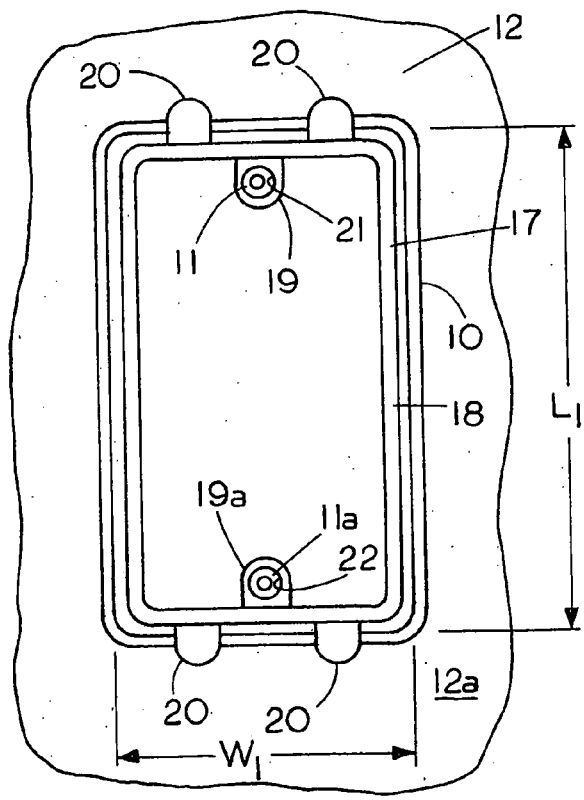
FIG. 3 is a front view of a wall-mounted junction box extension.

FIG. 3 shows a front view of the box extension 17 mounted on wall 12 with the wall flanges 20 engaging the wall 12 to limit the penetration or nesting of the box extension 17 into the junction box 10 mounted behind wall 12. The sleeve 19, which is affixed to the interior top portion of box extension 17 has an opening 21 therein, and the sleeve 19a, which is affixed to the internal lower portion box extension 17, which has an opening 22 therein, allow one to attach box extension 17 to the existing threaded opening in ear 11 and ear 11a by inserting fasteners through the opening in the sleeves and into the respective ears located proximate thereto.

Figure 2:
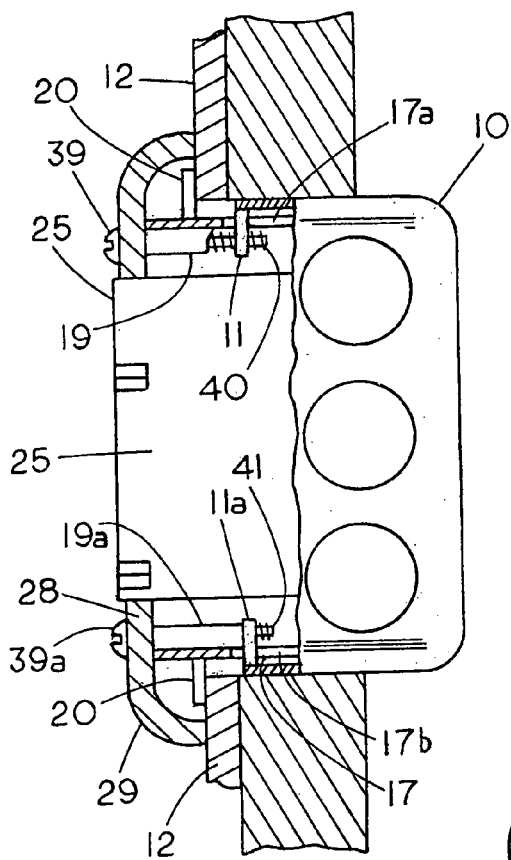
FIG. 2 is a cross-sectional view of a wall-mounted junction box extension and cover.

FIG. 2 shows a partial sectional view showing the box extension 17, the outlet receptacle 25 and the cover in an assembled or nested condition. FIG. 2 shows that in the assembled condition the box extension 17, which has smaller external dimensions (W and L as shown in FIGS. 1 and 1A) than the internal dimensions of the junction box (width denoted as $W_1$ and length as $L_1$ in FIG. 3), extends through the wall 12 and into the junction box 10. The wall flanges 20 limit the penetration or nesting of the box extension 17 into the junction box.

In order to secure the top of box extension 17 to the junction box 10 a first threaded fastener 39 extends through electrical device 25 and through a sleeve 19 mounted on the inside of box extension 17. The threads on fastener 39 engage a threaded sidewall in junction box ear 11 to allow one to secure the electrical device 25 and the box extension 17 directly to the ear 11 by rotation of fastener 39. Similarly, in order to secure the bottom of box extension 17 to the junction box 10 a first threaded fastener 39a extends through electrical device 25 and through a sleeve 19a mounted on the inside of box extension 17. Similarly, the threads on fastener 39a engage a threaded sidewall in ear 11a to allow one to secure the cover 28, the electrical device 25 and the box extension directly to the ear 11a by rotation of fastener 39a. Cover 28 is secured to the electrical device 25 in the conventional manner.

FIG. 4 is a partial section view of an alternate embodiment of the invention wherein the box extension 47 is mounted in a non-nesting, namely, an abutting or end to end condition with the end of the junction box 10 on wall 82 with the peripheral edge 47a of box extender 47 abutting against the peripheral edge 10a of box extension 10. In this embodiment the box extension 47 contains a sleeve 46, proximate outlet receptacle 25, with a threaded fastener 49 that extends through the sleeve 46 to engage the ear 11 in the junction box. In this embodiment the cover 48 and box extension 47 are held by the threaded fastener 49 (having threads 49a) and an identical threaded fastener (not shown) located on the lower portion of cover 48. The cover has a curved peripheral surface 48c and an end surface 48a, which abuts wall surface 82a. As this embodiment lacks the outwardly extending flanges to provide a uniform protrusion of the box extender one matches the cover size to the particular remodeling task.

FIG. 5 shows a partial sectional view of a further alternate embodiment of the box extension 57 wherein the box extension 57 also engages the junction box 10 on wall 82 in an abutting relationship with the lip 57a of box extension extending outward from wall surface 82a and the rim 57b of box extender 57 extending into wall 82 to abut against the peripheral edge of junction box 10. Fastening flanges 72 and 73 allow one to secure the box extender 57 to the junction box 10 through a top threaded fastener 32 and a lower threaded fastener 21. Upper fastener 22 and lower fastener 21 hold the junction box extender 57 to junction box 10. That is, the threads of upper fastener 22 engage ear 11 by rotation of fastener 22 and the threads 21 of lower fastener 21 engage ear 11a. In addition the electrical device 25 is also secured to the junction box 10 and the junction box extension 57 by fasteners 22 and 21. In this embodiment the cover 58, which extends over the electrical outlet 45 includes a set of separate fasteners 69 and 69a that engage the threaded recess 60 in electrical outlet 45. In this embodiment the cover 58 can be separately secured to the box extension 57. The cover has a contoured peripheral edge 59 and an end surface 59a that abuts the wall surface 82a to provide a finished appearance.

The embodiments of FIG. 4 and FIG. 5 are suitable for specialized applications that one wishes to mate the box extension directly to the junction box. While the embodiments of FIG. 4 and FIG. 5 are different from the embodiment of FIGS. 1–3 each of the junction box extension provide a junction box extension that engages a wall mounted junction box. In the embodiment of FIGS. 1–3 the junction box extension 17 engages through nesting while in the embodiment of FIGS. 4,5 the junction box engages through abutment. Although the embodiments of FIGS. 1–3 can require standard covers the embodiment of FIGS. 4,5 can include a different size covers for different application in order to have the cover mate to the wall. Thus the embodiment of FIGS. 1 to FIGS. 3 provides a universal junction box extension while the embodiments of FIGS. 4,5 provides a specialized extension.

In either case the junction box extensions or extenders include an open box, preferably of plastic, however it could be made of metal, with the box having a lip on one side and a rim on the opposite side and a flange for holding the open box proximate a wall mounted junction box wherein the lip of the open box protrudes beyond a wall surface to provide additional space to the junction box and the rim extends past the wall surface to engage the junction box. Whereas the method of increasing the size of a junction box mounted on a wall surface without replacing the junction box includes the steps of placing a box extension on the junction box with the junction box having sufficient width so that a lip of the box extension projects outward from the wall surface and placing a cover over box extension with the cover extending over the box extension and toward the wall surface to provide a finished appearance.

We claim:

1. A method of increasing the size of a junction box mounted on a wall surface without replacing the junction box comprising the steps of:
    placing a box extension having at least two spaced integral flange extending from an exterior surface of the box extension on the junction box with the box extension having sufficient width so that a lip of the box extension projects outward from the flange located proximate the wall surface; and
    placing a cover over the box extension while abutting a peripheral edge of the cover to a wall surface surrounding both the junction box and the box extension to provide a finished appearance.

2. The method of claim 1, including the step of removing an existing cover from the junction box.

3. The method of claim 1, including the step of removing an existing electrical device from the junction box.

4. The method of claim 1, including the step of installing a different electrical device in the junction box.

5. The method of claim 1, including the step of abutting a plurality of flanges of the box extension to the wall surface to support the box extension.

6. The method of claim 1 including the step of nesting a rim of the box extension in the junction box.

7. The method of claim 1 including the step of abutting a peripheral edge of the box extension against a peripheral edge of the junction box.

8. In combination:
    a wall surface;
    a junction box extension comprising an open box having a lip on one side and a rim on the opposite side;
    a flange integral to the box for holding said open box proximate a wall mounted junction box, said flange extending outwardly from the box for abutting against the wall surface wherein the lip of the open box protrudes beyond the flange to provide additional space to the junction box and the rim extends past the wall surface to engage the junction box; and
    a cover for encapsulating electrical connections in the junction box, the cover including a contoured peripheral edge having an end surface to abut the wall surface and cover the open box to provide a finished appearance.

9. The junction box extension of claim 8 wherein the rim is smaller than the junction box to enable the rim to nest in the junction box.

10. The junction box extension of claim 8 wherein the rim abuts a peripheral edge of the junction box.

11. The junction box extension of claim 8 wherein the flange extends outwardly for abutting against a wall surface to limit a penetration of the junction box extension into the junction box.

12. The junction box extension of claim 8 wherein at least four flanges extend outwardly from the junction box extension.

13. The junction box extension of claim 8 wherein the open box is made of plastic.

14. The junction box extension of claim 8 wherein the open box includes an ear relief thereon.

15. The junction box extension of claim 8 including a sleeve for securing the junction box extension to the junction box.

16. The junction box extension of claim 8 including a sleeve for securing the junction box extension to the junction box while the flange extends outwardly to engage the wall surface to hold the junction box extension in a nesting relationship with the junction box.

* * * * *